(12) United States Patent
Zhang et al.

(10) Patent No.: US 8,767,279 B2
(45) Date of Patent: Jul. 1, 2014

(54) HANDHELD IMAGING PROBE

(75) Inventors: Xiaojing Zhang, Austin, TX (US);
Youmin Wang, Austin, TX (US); Ting Shen, Austin, TX (US)

(73) Assignee: NanoLite Systems, Inc., Austin, TX (US)

(*) Notice: Subject to any disclaimer, the term of this patent is extended or adjusted under 35 U.S.C. 154(b) by 87 days.

(21) Appl. No.: 13/465,494

(22) Filed: May 7, 2012

(65) Prior Publication Data

US 2012/0281265 A1 Nov. 8, 2012

Related U.S. Application Data

(60) Provisional application No. 61/483,311, filed on May 6, 2011.

(51) Int. Cl.
*G02B 26/08* (2006.01)

(52) U.S. Cl.
USPC ........................................ 359/212.1

(58) Field of Classification Search
USPC ............................... 359/197.1, 212.1–215.1
See application file for complete search history.

(56) References Cited

U.S. PATENT DOCUMENTS

2006/0261263 A1* 11/2006 Ishihara et al. ............... 250/234

* cited by examiner

*Primary Examiner* — Euncha Cherry
(74) *Attorney, Agent, or Firm* — Anthony P. Ng; Yudell Isidore Ng Russell PLLC

(57) ABSTRACT

A handheld imaging probe for performing optical coherence tomography is disclosed. The handheld imaging probe includes a lens tube and a housing. The lens tube contains an objective lens and a polycarbonate sheet. The polycarbonate sheet provides a bio-safe contact with a tissue sample to be examined. The housing, which is connected to the lens tube, contains a micromirror for directing a laser beam to irradiate the tissue sample via the objective lens and the polycarbonate sheet.

10 Claims, 3 Drawing Sheets

HANDHELD IMAGING PROBE

PRIORITY CLAIM

The present application claims priority under 35 U.S.C. §119(e)(1) to provisional application No. 61/483,311, filed on May 6, 2011, the contents of which are incorporated herein by reference.

BACKGROUND OF THE INVENTION

1. Technical Field

The present invention relates to optical imaging probes in general, and in particular to a handheld optical imaging probe.

2. Description of Related Art

A laser-based scanning fluorescence confocal imaging system typically includes a confocal configuration probe having a micromirror and an objective lens. Along with the confocal probe, the imaging system can obtain images of the subsurface of a sample based on the information within the light that returns from the sample after the sample has been irradiated with a low-coherence light source. An imaging depth in the order of a few hundred micrometers, with a spatial resolution of a few micrometers is relatively easy to achieve by using light intensity levels in the order of 100 µW. Thus, the above-mentioned imaging system is very useful for in vitro and in vivo tissue structure imaging applications.

Current endoscopes are typically more than 5 mm thick. The thickness of current endoscopes, especially when compared with their en face imaging area (about 2 mm wide) makes them undesirable as a needle endoscope for image-guided surgical procedures. One major challenge of making a thinner endoscope lies with the difficulty of designing a probe beam deflection system that is capable of covering a sufficient scan volume while constraining the probe diameter to be less than about 2 mm to minimize the invasiveness of the probe. A reasonable scan volume for providing sufficient image information would be a conical volume that is about 3 mm in length and about 2 mm in diameter at its maximum circumference.

SUMMARY OF THE INVENTION

In accordance with a preferred embodiment of the present invention, a handheld imaging probe includes a lens tube and a housing. The lens tube contains an objective lens and a polycarbonate sheet. The polycarbonate sheet provides a biosafe contact with a tissue sample to be examined. The housing, which is connected to the lens tube, contains a micromirror for directing a laser beam to irradiate the tissue sample via the objective lens and the polycarbonate sheet.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
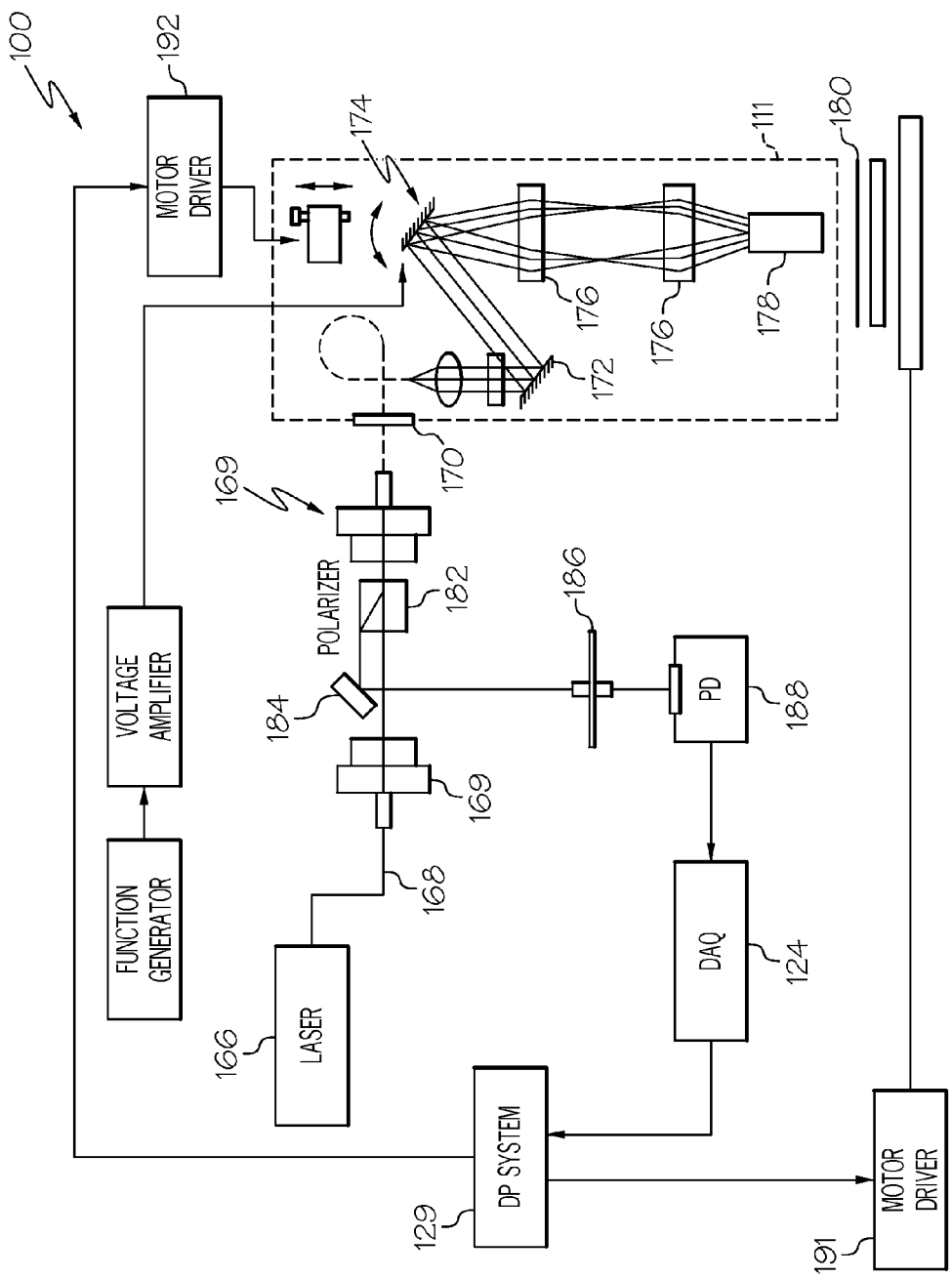
FIG. 1 is a diagram of a laser-scanning confocal microscope in which a preferred embodiment of the present invention is applicable.

Referring now to the drawings and in particular to FIG. 1, there is depicted a diagram of a laser-scanning confocal microscope in which a preferred embodiment of the present invention is applicable. As shown, a laser-scanning confocal microscope 100 includes a diode laser 166, a set of collimation optics 167, an avalanche photodetector 188, and a handheld probe 111. Collimation optics 167 may include collimators 169, a walk-off polarizer 182 and an offset mirror 184. Handheld probe 111 includes a zero-order wave-plate 170, a stationary mirror 172, a micromirror 174, 3X Keplerian beam expanders 176 and a high numerical aperture aspheric objective lens 178.

A linearly-polarized laser beam from diode laser 166 (such as 635 nm diode laser from Blue Sky Research, Inc., FMXL-635-017-PA-0B) is initially coupled into a single-mode polarization maintaining (PM) fiber 168. Light exiting PM fiber 168 is then collimated by collimators 169 to a 1 mm diameter beam through zero-order quarter wave-plate 170 whose axis is oriented at 45° to the incident polarization angle in order to convert the laser beam to a circular polarization. After reflection off stationary mirror 172, the laser beam is incident on micromirror 174 at 22.5° to micromirror 174 normal. Micromirror 174 scans the laser beam across objective lens 178, providing an effective numerical aperture of about 0.48 at a tissue sample 180. Reflected light is subsequently converted into a linear polarization that is orthogonal to the initial laser beam polarization, which is isolated using walk-off polarizer 182 and offset mirror 184, and directed through a spatial filter 186 into avalanche photodetector 188.

Higher values of numerical aperture of objective lens 178 can be used to obtain better optical sectioning with high contrast in highly scattering tissue sample 180. The resolution, field of view, and contrast of confocal microscope 100 is largely determined by micromirror 174. There is, however, a trade-off in selecting between resolution and field of view. The product of micromirror 174's size and its optical deflection angle determines the number of resolvable points in the final image, which translates into a given field of view and resolution according to the numerical aperture of objective lens 178.

The number of resolvable points, N, for micromirror 174 in a one-dimensional scan is given by $$N = \frac{D\theta}{\lambda} \quad (1)$$

where $\theta$ is the mechanical scanning half-angle of micromirror 174, $\lambda$ is the operating wavelength, and D is the diameter of micromirror 174.

Preferably, handheld probe 111 can be used to provide images of a 280×300 µm field of view at two frames per second. Three-dimensional imaging can also be achieved through the usage of auto-focusing and mosaic imaging for extended lateral view (6 mm×8 mm). The number of resolvable points (408×255) in the images is proportional to the product of the diameter of micromirror 174 and the optical scan angle, as stated in Equation (1). Micromirrors with larger diameters (~1 mm) capable of providing the same deflection angles can be designed within the limits set by the maximum driving voltage and at the cost of increased energy consumption.

After receiving output signals from a digital acquisition (DAQ) device 124, a data processing system 129 generates an image on a display responsive to the output signals as successive frames in real-time, in accordance with the scanning pattern of handheld probe 111. Data processing system 129 may control the positions of handheld probe 111 in relation to sample 180 via various motors 191, 192, respectively.

Figure 2:
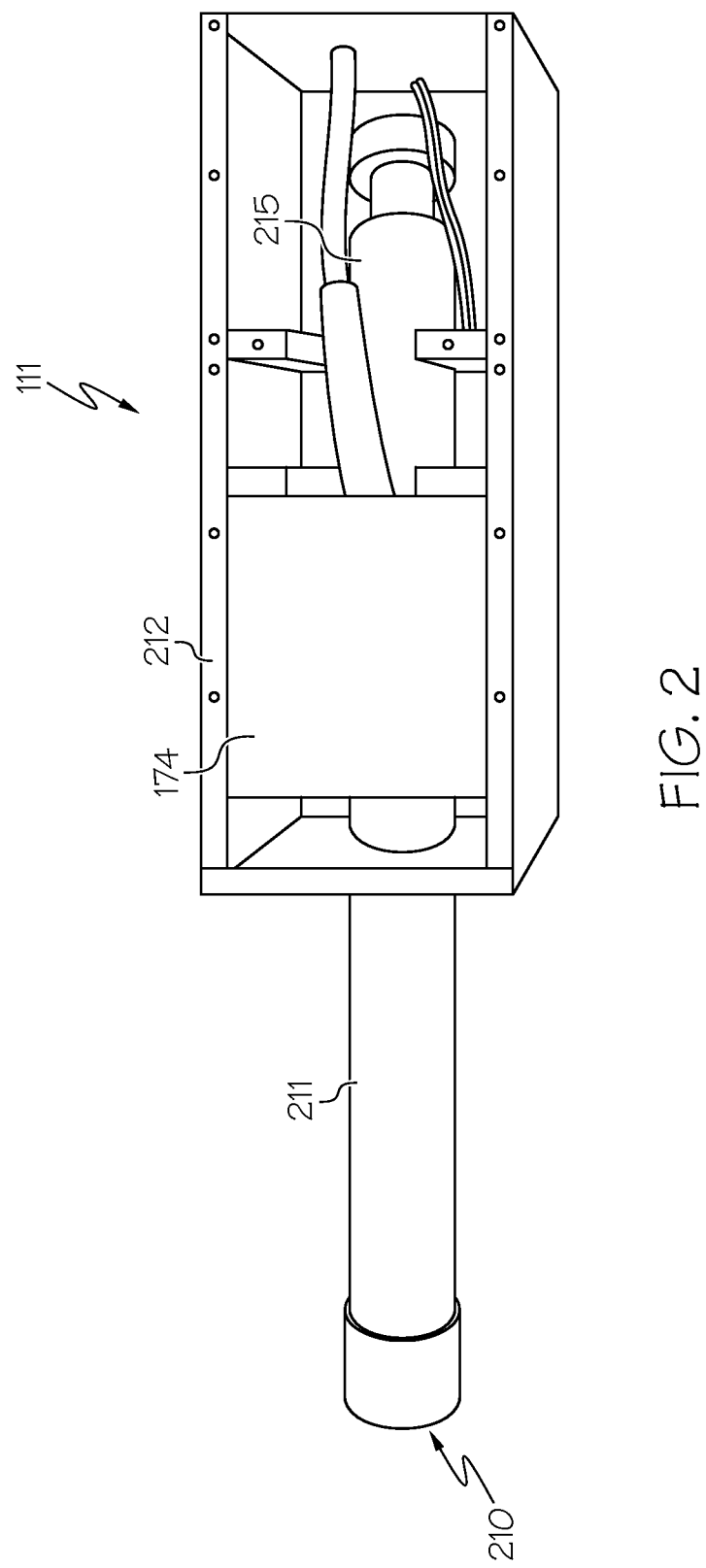
FIG. 2 is a diagram of a handheld probe of the confocal microscope from FIG. 1, in accordance with a preferred embodiment of the present invention.

With reference now to FIG. 2, there is depicted a detailed diagram of handheld probe 111 from FIG. 1, in accordance with a preferred embodiment of the present invention. Handheld probe 111 was designed to provide fast screening and diagnosis of epithelial tissue for carcinoma detection. As shown, handheld probe 111 includes a lens tube 211 connected to a metal housing 212. Objective lens 178 is included within lens tube 211. The tip of lens tube 211 hold a polycarbonate sheet 210 for ensuring bio-safe contact with any tissue sample to be examined. Lens tube 211 is preferably made of Vero White Polyjet Resin (FC-830) stainless steel.

Metal housing 212, which is preferably electrically-grounded, is preferably designed to contain an inner compartment 270. Inner compartment 270 is connected to a partition 270 within metal housing 212 via a set of pulling springs 272 and a pushing pico-motor 215. Inner compartment 270 is allowed to smoothly slide along the longitudinal axis (z-axis) of metal housing 212. The depth inner compartment 270 can be slide along the longitudinal axis of metal housing 212 is realized through the countering force applied by pulling springs and pushing pico-motor 215. Micromirror 174 is packaged within the inner compartment 270. Micromirror 174 can be driven by motor driver 192 (from FIG. 1). Picomotor 215 helps to realize z-directional focus tuning and therefore achieve three-dimensional depth-sensitive imaging. Flexible electronics (allowing free movement and positioning of handheld probe 111 within an in vivo environment) are included within metal housing 212 to drive micromirror 174.

Within handheld probe 111, optical and electrical interfaces are separated from each other for easy assembly. Electronics are built on a flexible platform that allows unrestricted movement and positioning of handheld probe 111 within an in vivo environment. A contact imaging system is integrated to hold handheld probe 111 steady against a tissue sample to provide imaging without motion artifacts. Lissajous scanning imaging fully maximizing the scanning angle of micromirror 174 to enlarge field of view of handheld probe 111.

Figure 3:
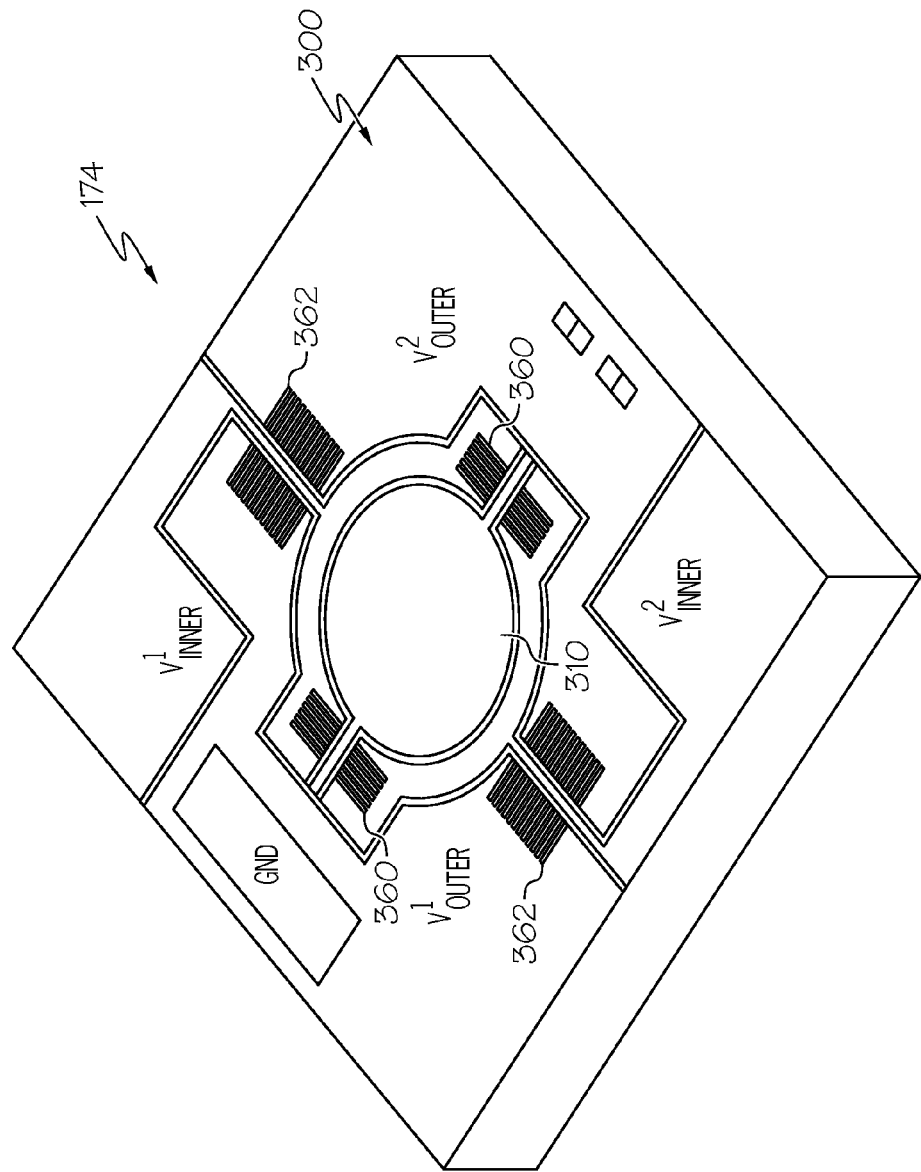
FIG. 3 is a detailed diagram of a micromirror within the handheld probe from FIG. 2, in accordance with a preferred embodiment of the present invention.

Referring now to FIG. 3, there is depicted a detailed diagram of micromirror 174 from FIG. 2, in accordance with a preferred embodiment of the present invention. As shown, the size of a semiconductor chip 300 containing micromirror 174 is approximately 2.8×2.8 mm$^2$ in size, and the diameter of rotatable mirror 310 is approximately 1,024 µm. As shown, micromirror 174 has two axes, and electrostatic vertical combdrives can be utilized to provide fast, high-torque rotary actuation about the two axes of micromirror 174. For example, two sets of staggered vertical combdrive actuators 360, 362 can be utilized to rotate rotatable mirror 310 along each of the two axes. The movements of combdrive actuators 360, 362 can be controlled by the application of appropriate electrical biases on chip 300 via pads $V^1_{inner}$, $V^1_{outer}$, $V^2_{inner}$, $V^2_{outer}$ and Ground. Combdrive actuators 360, 362 include rotor and stator comb fingers. The thickness and spacing between rotor and stator comb fingers are preferably fixed at approximately 8 µm.

The performance of micromirror 174 is characterized by its response to various electrical signal inputs. For example, one input can be a sinusoidal variable-frequency voltage with a suitable offset (to ensure applied voltage is always positive) between ground and one of combdrive actuators 360, 362 of each rotation axis. Optical scan angles of 22° and 12° on the inner and outer axes are achieved for frequency values around 2.81 kHz and 670 Hz on the inner and outer rotation axes, respectively. On the other hand, for a static voltage applied between ground and one of combdrive actuators 360, 362 on each rotation axis, off-resonance actuation using only one combdrive actuator results in single-sided deflection. The total optical deflection angle can be doubled by making use of both combdrive actuators 360, 362 on either side of the torsion bars forming the rotation axis. In this respect, off-resonance operation differs significantly from driving at resonant frequency. Optical scan angles of about 5° and 4.5° can be achieved by applying static voltages up to 240 V on the inner and outer axes, respectively.

Preferably, micromirror 174 is fabricated on a semiconductor chip via a set of complementary-metal oxide semiconductor (CMOS) compatible procedures. Starting from a double silicon-on-insulator (SOI) wafer, a layer of silicon dioxide is first deposited using low-temperature chemical vapor deposition (LPCVD) to form a hard etch mask. Photolithographic patterning and reactive ion etching (RIE) of coarse (mask 1) and exact features of micromirror 174 (mask 2) are then performed using a self-alignment process. Afterwards, oxide RIE is used to remove the exposed silicon dioxide, completing the hard mask formation. Deep-reactive ion etching (DRIB), stopped on the first buried oxide layer, can be used to provide features of both stator and rotor combs in the upper device layer. A second DRIB etch, stopped on the second buried oxide layer, is used to remove the upper device layer silicon above the rotor combs while simultaneously defining the rotor features in the lower device layer. Backside substrate DRIB (mask 3) followed by oxide RIE on front-and backsides are used to remove any remaining oxide in the mask and second buried oxide layers, which released the device and completed the fabrication process. A detailed description of the fabrication of micromirror 174 can be found in U.S. patent application Ser. No. 12/881,231, the pertinent of which is incorporated by reference herein.

Micromirror 174 is preferably mounted onto a printed circuit board (PCB) to ease wire bonding, power delivery and packaging. The semiconductor chip containing micromirror 174 has the wire bondings at various copper pads. Power wires can be connected to the PCB.

The primary mechanical resonant frequencies of micromirror 174 are 2.57 kHz and 1.2 kHz for the inner and outer rotation axis, respectively. The movement of micromirror 174 forms a lissajous curve by applying a sinusoidal high-voltage AC actuating signal onto the two axes.

Lissajous scanning patterns and raster scanning patterns are used in laser scanning imaging systems. Compared with raster scanning patterns in which actuation off-resonance requires higher voltage and smaller deflection angle could be achieved, large field-of-view (FOV) imaging is easier to be enabled with smaller waveforms for lissajous scanning patterns. Due to the selection of the driving voltage frequencies, which is the resonant frequency pair of micromirror 174, the image updating rate and the maximum pixel number achievable in the image can be determined.

In order to maximize the FOV, micromirror 174 should be run under the lissajous scanning pattern. A pair of 75 V peak-to-peak sinusoidal ac voltages with an offset of 50 V can be used to actuate micromirror 174 to reach the maximum optical deflection angles at 28° and 25°, respectively for the inner and outer axes.

As has been described, the present invention provides a handheld imaging probe. While the invention has been particularly shown and described with reference to a preferred embodiment, it will be understood by those skilled in the art that various changes in form and detail may be made therein without departing from the spirit and scope of the invention.

What is claimed is:

1. A handheld imaging probe comprising:
    a lens tube containing an objective lens and a polycarbonate sheet for providing bio-safe contact with a tissue sample to be examined; and
    a housing connected to said lens tube, wherein said housing contains a micromirror for directing a laser beam to irradiate a tissue sample via said objective lens and said polycarbonate sheet.
2. The probe of claim 1, wherein said lens tube is made of stainless steel.
3. The probe of claim 1, wherein said housing includes a pico-motor for providing z-directional focus tuning of said micromirror.
4. The probe of claim 1, wherein said micromirror further supplies mosaic imaging to provide a large field of view for said probe.
5. The probe of claim 1, wherein said micromirror includes a rotatable mirror.
6. The probe of claim 5, wherein said micromirror is made of a semiconductor chip.
7. The probe of claim 5, wherein a diameter of said rotatable mirror is approximately 1,024 μm.
8. The probe of claim 5, wherein said rotatable mirror is capable of being rotated along two different axes.
9. The probe of claim 5, wherein a rotation of said rotatable minor is controlled by two set of combdrive actuators.
10. The probe of claim 5, wherein optical scan angles of 22° and 12° on an inner and outer axes of said rotatable mirror are achieved for frequency values around 2.81 kHz and 670 Hz on said inner and outer rotation axes, respectively.

* * * * *